United States Patent
Kubota et al.

(10) Patent No.: US 6,774,900 B1
(45) Date of Patent: Aug. 10, 2004

(54) IMAGE DISPLAYING DEVICE, IMAGE PROCESSING DEVICE, IMAGE DISPLAYING SYSTEM

(75) Inventors: Hiroshi Kubota, Tokyo (JP); Kenya Yamashita, Tokyo (JP); Masahiro Imanari, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/673,210

(22) PCT Filed: Feb. 16, 2000

(86) PCT No.: PCT/JP00/00865

§ 371 (c)(1),
(2), (4) Date: Dec. 26, 2000

(87) PCT Pub. No.: WO00/49579

PCT Pub. Date: Aug. 24, 2000

(30) Foreign Application Priority Data

Feb. 16, 1999 (JP) .............................. 11/36594

(51) Int. Cl.⁷ .............................................. G06T 15/00
(52) U.S. Cl. ...................................................... 345/473
(58) Field of Search ................................ 345/473, 474, 345/475, 619, 629

(56) References Cited

U.S. PATENT DOCUMENTS

| | | | | |
|---|---|---|---|---|
| 4,698,625 A | * | 10/1987 | McCaskill et al. | 345/157 |
| 5,404,429 A | * | 4/1995 | Shirasaka | 345/419 |
| 5,590,062 A | * | 12/1996 | Nagamitsu et al. | 703/6 |
| 5,692,117 A | * | 11/1997 | Berend et al. | 345/475 |
| 5,710,894 A | * | 1/1998 | Maulsby et al. | 345/763 |
| 5,990,862 A | * | 11/1999 | Lewis | 345/858 |
| 6,545,669 B1 | * | 4/2003 | Kinawi et al. | 345/173 |
| 6,567,083 B1 | * | 5/2003 | Baum et al. | 345/426 |

FOREIGN PATENT DOCUMENTS

| | | |
|---|---|---|
| EP | 1 008 959 A1 | 6/2000 |
| JP | 7-73338 | 3/1995 |
| JP | 7-116341 | 5/1995 |
| JP | 7-155472 | 6/1995 |
| JP | 7-244747 | 9/1995 |
| JP | 10-154242 | 6/1998 |
| JP | 10-230075 | 9/1998 |
| JP | 11-7543 | 1/1999 |
| JP | 11-15996 | 1/1999 |
| JP | WO99/12129 | 3/1999 |
| WO | WO 96/22580 | 7/1996 |

OTHER PUBLICATIONS

X. Tu, D. Terzopoulos, "Perceptual Modeling for the Behavioral Animation of Fishes," Department of Computer Science, University of Toronto, Aug. 26, 1994, pp. 185–200.

* cited by examiner

Primary Examiner—Phu K. Nguyen
(74) Attorney, Agent, or Firm—Finnegan, Henderson, Farabow, Garrett & Dunner, L.L.P.

(57) ABSTRACT

An image displaying device 13 comprising a display unit for displaying images produced when a three-dimensional model is viewed from a predetermined observing point, and an input means provided along the display surface of the display unit, characterized in that the display unit is constituted by a plasma display device and can control images by operating the input means. An image processing device which displays on a display means images produced when a plurality of moving bodies (such as fish) moving in a virtual three-dimensional space are viewed from a predetermined observing point, and which determines the above observing point position based on a status of one or a group of moving bodies moving together uniformly selected from among the plurality of moving bodies, thereby providing a high-playing-level playing device in a viewing amusement device or the like which produces viewing images indicating the behaviors of a plurality of moving bodies.

11 Claims, 14 Drawing Sheets

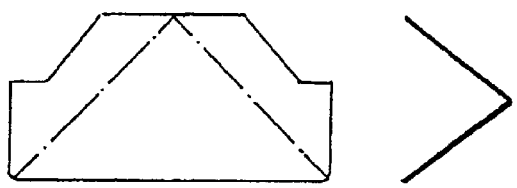
CRT
Fig. 1(a)
PDP
Fig. 1(b)
Fig. 2(a)
CRT
Fig. 2(b)
PDP
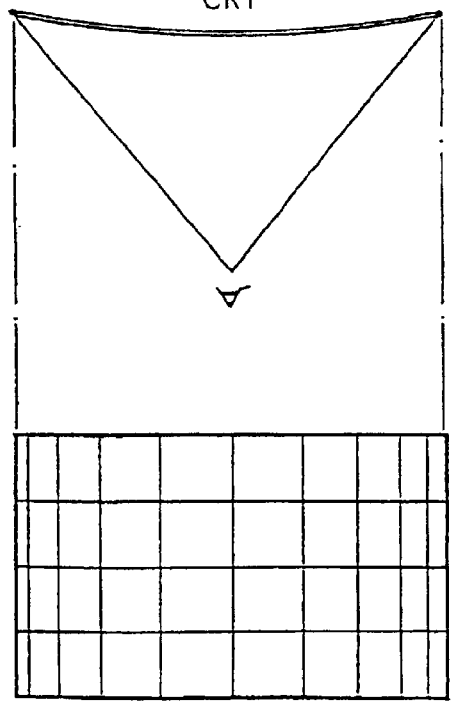
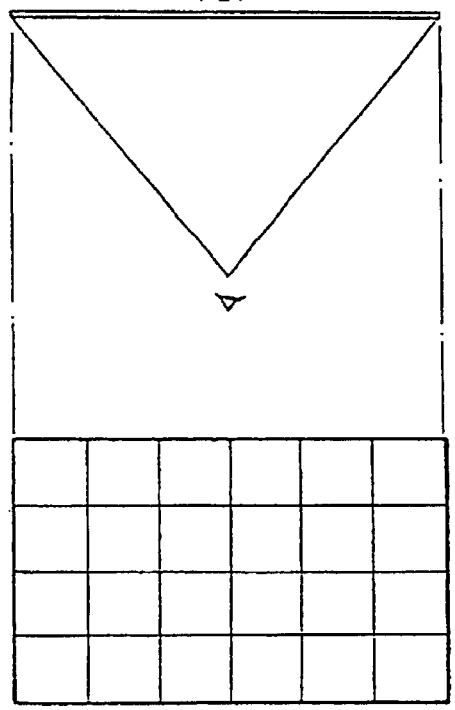
image viewed from
the front (CRT)
image viewed from
the front (PDP)

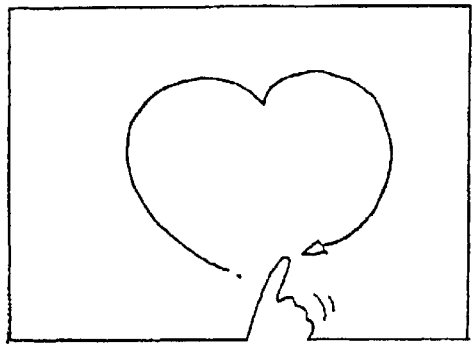
Fig. 15(a)
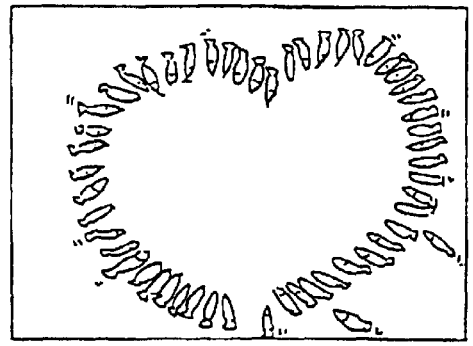
Fig. 15(b)
FIG. 16
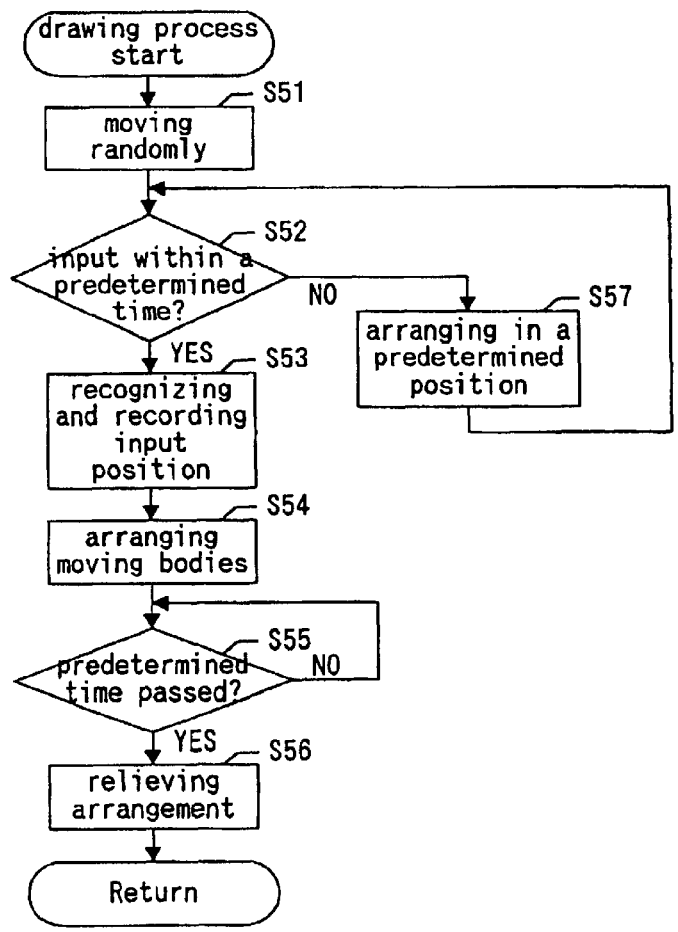

IMAGE DISPLAYING DEVICE, IMAGE PROCESSING DEVICE, IMAGE DISPLAYING SYSTEM

TECHNICAL FIELD

The present invention relates to an image displaying device, an image processing device and an image displaying system.

BACKGROUND ART 1. conventionally, in the field of a playing device comprising an image displaying device, there has been a viewing amusement device where fish or other moving bodies are displayed in the image displaying device and are enjoyed as virtual pets. In an image processing device stored in the viewing playing device, virtual models imitating the moving bodies can be formed in a virtual three-dimensional space and images of the virtual models viewed from a prescribed observing point can be displayed in a displaying means.

However, when the observing point or the observed point is fixed, the background screen does not change and the stereoscopic expressions are insufficient. Moreover, when the movement of the observing point or the observed point is standardized, the change of the background screen is also standardized and the interest of a viewer may be thereby reduced. On the other side, when the observing point or the observed point is moved at random, the moving bodies do not come into the visual field or come into the center of the visual field of the viewer, so that the interest of the viewer may be reduced.

2. Furthermore, if the moving bodies come into the visual field, there is a possibility that the interest of the viewer will be reduced when the distance between the observing point and the moving bodies is too long or too short. Moreover, the image is easier to see, when the position of the observing point or the observed point is set taking into consideration the facing and moving direction of the moving bodies In addition, when the movement of the moving bodies suddenly changes, it makes the image easier to see when the movement of the observing point or the observed point is reduced.

3. Moreover, if the observing point is moved in accordance with the movement of the moving bodies, and the interest of the viewer may be thereby reduced, such that there is less movement in the moving bodies, produces less movement of the observing point moves less.

4. Furthermore, a known image displaying system displays images produced when a virtual space model is viewed from a predetermined observing point, and can display the behavior of the model lit by the virtual light.

However, there is no conventional image displaying system which the portion to be illuminated by light can easily and freely set on the screen.

5. Moreover, in a known image displaying device, when a mouse pointer is moved to a predetermined part on the screen, and a mouse is clicked at such portion, explanations on images displayed at the predetermined part on the screen are thereby displayed.

However, there is no conventional viewing image displaying system which displays images of more than one fish or other animal or plant on the image displaying device for viewing such images as virtual pets and displays the information of each moving body.

6. Furthermore, if, for example, outside images viewed through a window of a submarine is to be displayed in the image displaying device as viewing images, these images are made realistic by displaying images of window frames together with the images viewed outside the windows.

Nevertheless, since the thickness of the window frames can not be illustrated even if the window frames are displayed, the image may lack reality and leave some unsatisfied feeling as images for viewing.

7. Moreover, a known displaying system has an input means on the screen of the image displaying device, and when the screen is traced with an associated inputting pen or the like, the line traced can be drawn.

Nevertheless, there is no conventional displaying system which arranges a plurality of moving bodies along on the trail traced and draws pictures with such plurality of moving bodies.

8. Furthermore, a known displaying system displays figures or characters which are previously recorded in the displaying device and can update the other figures or characters previously recorded.

However, there is no conventional displaying system which displays images of more than one fish or other moving bodies on the image displaying device and displays line drawings (such as characters and figures) by arranging the plurality of moving bodies in the viewing playing device where such moving bodies are enjoyed as virtual pets.

9. Moreover, the image displaying devices such as CRT, liquid crystal and the like conventionally existed in the field of the image displaying device. Nevertheless, since CRT uses cathode ray tube, whereby greater depth of the image displaying device is required if a large installation space is required, an especially large screen is to be set (see FIG. 1). Moreover, an image displaying device using liquid crystal is expensive, and the cost will increase if an especially large screen is desired. Furthermore, if a joystick or various operation buttons are provided as an input device, a larger installation space is required. In addition, in the case of CRT, the maximum size of the screen is thirty-six (36) inches, and a larger screen may not be obtained.

Furthermore, if the surface of the display curves as in CRT, the image portion at the ends of the display surface are distorted (See FIG. 2). Especially, if images prepared by the three-dimensional CG are displayed, there is a problem that the distortion of images impairs the expression of solidity. Moreover, although distortion at the end of images decreases when the images are viewed from some distance, the distortion at the ends of the images will increase when the viewer approaches the screen to see. Especially, in order to increase the interactiveness between a viewer of the image and the screen by setting a touch censor on the screen, the viewer of the images must approach the screen to see the images, and the distortion of the screen a problem which can not be ignored.

Therefore, an object of the present invention is to provide a highly-viewing-level playing device, whereby viewing images indicate the movements of a plurality of moving bodies, and the present intention are the objects described below in further detail.

Firstly, an object of the present invention is to provide an image processing device capable of adequately retaining an observing point position to at least one fish by determining the observing point position based on a status of the one moving body or the group of moving bodies, and adequately displaying the moving bodies moving around on the virtual space to prevent the viewer's interest thereof from decreasing by adequately displaying at least one of the fish.

Secondly, an object of the present invention is to provide an image processing device which is capable of adequately displaying the moving bodies moving around on the virtual space to prevent the viewer's interest thereof from decreasing by determining an observing point and a sight-line to make sure that the moving bodies are displayed.

Thirdly, the object of the present invention is to provide an image processing device capable of adequately displaying the moving bodies moving around on the virtual space to prevent the viewer's interest thereof from decreasing by making images change.

Fourthly, the object of the present invention is to provide an image displaying system capable of selecting a part to be lightened only by performing a predetermined input on the screen.

Fifthly, the object of the present invention is to increase the enjoyment of the game and to make it easier to understand by displaying a plurality of fishes and other moving bodies on the image displaying device and easily display the explanation of each of the plurality of moving bodies in the viewing amusement device, wherein the plurality of the moving bodies are enjoyed such as virtual pets.

Sixthly, the object of the present invention is to provide a viewing image displaying device capable of displaying images being rich in reality.

Seventhly, the object of the present invention is to provide a new method of expression in the image displaying system, wherein images drawn by the tracing line on the screen are displayed. Moreover, the object of the present invention is to add viewing characteristics to the image displaying system by arranging the moving bodies to any discretionary array in accordance with the tracing line that are traced on the screen in the viewing image displaying system.

Eighthly, the object of the present invention is to display a plurality of fishes and other moving bodies in the image displaying device, make the moving bodies, in a usual status, naturally move in a viewing playing device wherein the moving bodies are enjoyed as virtual pets, and in a predetermined mode, make the plurality of moving bodies at a predetermined arrangement to show a predetermined line drawing (characters, drawings and the like) as a whole and increase the enjoyment.

Ninthly, the object of the present invention is to provide an image displaying device capable of making a larger screen as well as making the space of setting up thereof small. Furthermore, the object of the present invention is to provide an image displaying device with a large screen wherein images are not distorted.

DISCLOSURE OF THE INVENTION

In order to achieve the aforementioned objects, the present invention is an image processing device for displaying on a display means images produced when a plurality of moving bodies moving in a virtual three-dimensional space are viewed from a predetermined observing point and characterized in determining the observing point position based on the status of one or a group of moving bodies moving together uniformly selected from among the plurality of the moving bodies.

Moreover, it is desirable that a sight-line direction from the observing point is determined based on the status of the moving body or the group or moving bodies.

Furthermore, it is desirable that the observing point position is changed from the position based on the one moving body or the group of moving bodies to the position based on another moving body or another group of moving bodies every predetermined time.

In addition, the image processing device of the present invention comprises: a moving body model generating means for generating virtual models imitating each of multiple moving bodies moving in a virtual three-dimensional space, a moving body selecting means for selecting one or a group of moving bodies moving together uniformly selected from among the multiple moving bodies, a status recognizing means for recognizing a status of the moving body or group of moving bodies, an observing point position determining means for determining an observing point position based on the status of the moving body or group of moving bodies, and an image generating means for generating images produced when a whole or a part of the multiple moving bodies are viewed from the observing point.

Moreover, it is desirable that the image processing device of the present invention comprises sight-line direction determining means for determining a sight-line direction based on the status of the moving body or group of moving bodies, wherein the image generating means generates images when a model is viewed from the observing point to the sight-line direction.

Furthermore, the present invention comprises an image processing device for displaying images produced when one or a plurality of moving bodies moving in a virtual three-dimensional space are viewed from a predetermined observing point, characterized in that a distance between an observing point determined when one moving body or group of moving bodies moving together uniformly selected from among the one moving body or multiple moving bodies move to a direction away from the observing point and the moving body or group of moving bodies is shorter than a distance between an observing point determined when the moving body or group of moving bodies approach to the observing point and the moving body or group of moving bodies.

In addition, the image processing device of the present invention comprises; a moving body model generating means for generating virtual models imitating each of one or a plurality of moving bodies moving in a virtual three-dimensional space, a status recognizing means for recognizing a status of one or a group of moving bodies moving together uniformly selected from among the moving body or the plurality of moving bodies, an observing point position determining means for determining an observing point based on the status of the moving body or the group of moving bodies, and an image generating means for generating images produced when a whole or a part of the multiple moving bodies are viewed from the observing point, and characterized in that the status recognizing means recognizes the position (Pf) and the direction (vf) of the moving body or the group of moving bodies, and the observing point position determining means determines the observing point position(Pn) based on the position and the direction of the moving body or the group of moving bodies.

Further, it is desirable that the observing point position determining means calculates a predetermined basic direction (V'f) based on the direction of the moving body or the group of moving bodies (Vf), calculates a position (B') at a predetermined distance (Ls) away from a plane containing a position (Bf) at a predetermined distance (Lf) away from the position of the moving body or the group of moving bodies (Pf) to the predetermined basic direction (V'f), and thereby determines the observing point position (Pn).

The present invention is an image processing device for displaying on a displaying means images produced when one or a plurality of moving bodies moving in a virtual three-dimensional space are viewed from a predetermined observing point, and characterized in determining the above observing point position based on the status of one or a group of moving bodies moving together uniformly selected from among the moving body or the plurality of moving bodies and determining a sight-line direction from the observing point based on the status of the moving body or the group of moving bodies, wherein the sight-line direction points forward of the moving direction of the moving body or the group of moving bodies when the moving body or the group of moving bodies are moving.

An image processing device of the present invention comprises: a moving body model generating means for generating a virtual model imitating each of one or a plurality of moving bodies moving in a virtual three-dimensional space, a status recognizing means for recognizing a status of one or a group of moving bodies moving together uniformly selected from among the moving body or the plurality of moving bodies, an observing point position determining means for determining an observing point position based on the status of the moving body or the group of moving bodies, a sight-line direction determining means ;for determining a sight-line direction based on the status of the body or the group of moving bodies, and an image generating means for generating images produced when a whole or a part of the plurality of moving bodies are viewed from the observing point, and characterized in that the image generating means generates images produced when the sight-line direction is viewed from the observing point, the status recognizing means recognizes the position (Pf) and the direction (Vf) of the moving body or the group of moving bodies, and the sight-line direction determining means determines a sight-line direction based on the present position ($K_o$) and the past position the predetermined time before ($K_n$) of the moving body or the group of moving bodies recognized by the aforementioned status recognizing means.

Moreover, it is desirable that the sight-line direction determining means determines a sight-line direction by putting the observed point at the predetermined point on the extension line straightly to the present position ($K_o$) from the past position the predetermined time before ($K_n$) based on the present position ($K_o$) and the past position the predetermined time before ($K_n$) of the moving body or the group of moving bodies recognized by the status recognizing means Furthermore, the present invention is all image processing device for displaying on a display means images produced when one or a plurality of moving bodies moving in a virtual three-dimensional space are viewed from a predetermined observing point, and characterized in that the above observing point position is determined based on the status of one or a group of moving bodies moving together uniformly selected from among the moving body or the plurality of moving bodies, and the observing point moves behind the movement of the movement of the moving body or the group of moving bodies.

The present invention is an image processing device for displaying on a display means images produced when one or a plurality of moving bodies moving in a virtual three-dimensional space are viewed from a predetermined observing point, and characterized in that the observing point position is determined based on a status of one or a group of moving bodies moving together uniformly selected from among the moving body or the plurality of moving bodies, and a sight-line direction from the observing point is determined based on the status of the moving body or the group of moving bodies, and the sight-line direction moves behind the movement of the moving body or the group of moving bodies.

The present invention is an image processing device for displaying on a display means images produced when one or a group of moving bodies moving in a virtual three-dimensional space are viewed from a predetermined observing point, and comprises an observing point target position ($P_o$) calculating means for calculating a target position of the observing point based on the status one or a group of moving bodies moving together uniformly selected from among the moving body or the group of moving bodies and an observing point position determining means for determining an observing point position based on the calculation result obtained by the observing point target position calculating means, wherein said observing point position determining means calculates a position ($P_n$) which divides at a prescribed ratio a line segment connected between an observing point position ($P_p$) immediately determined before the calculation and the observing point target position ($P_c$) newly calculated by said observing point target position calculating means after a predetermined period of time, and determines a new observing point The present invention is an image processing device for displaying on a display means images produced when one or a group of moving bodies moving in a virtual three-dimensional space are viewed from a predetermined observing point, and comprises an observing point position determining means for determining the observing point position based on the status of a moving body or a group of moving bodies moving together uniformly selected from among the moving body or the plurality of moving bodies, a sight-line direction target figure calculating means for calculating a target figure of a sight-line direction from the aforementioned observing point based on the status of the moving body or the group of moving bodies, and a sight-line direction determining means for determining a sight-line direction based on a calculating result of the sight-line direction target figure calculating means, wherein the sight-line direction determining means calculates a direction ($V_n$) where the direction of observing point ($V_p$) determined just before and a sight-line direction target figure ($V'_c$) newly calculated after a predetermined period of time by the aforementioned sight-line direction target figure calculating means are shared at a predetermined rate and determines the direction ($V_n$) as a new sight-line direction.

The present invention is an image processing device for displaying on a display means images produced when one or a plurality of moving bodies moving in a virtual three-dimensional space are viewed from a predetermined observing point and comprises observing point position determining means for determining the observing point position based on the status of one or a group of moving bodies moving together uniformly selected from among the moving body or plurality of moving bodies, sight-line direction target figure calculating means for calculating a target figure of a sight-line direction from the observing point based on the status of the moving body or the group of moving bodies and sight-line direction determining means for determining a sight-line direction based on a calculating result obtained by the sight-line direction target figure calculating means, wherein the sight-line direction determining means calculates a direction ($V_n$) where the direction of the observing point ($V_p$) determined just before and a sight-line direction target figure ($V'_c$) newly calculated after a predetermined period of time by the sight-line direction target figure calculating means are shared at a predetermined rate and determines the direction ($V_n$) as a new sight-line direction.

Moreover, the present invention is an image processing device for displaying on a display means images produced when one or a group of moving bodies moving in a virtual three-dimensional space are viewed from a predetermined observing point and comprises an observing point basic figure calculating means for calculating a basic figure of the observing point based on a status of one or a group of moving bodies moving together uniformly selected from among the moving body or the plurality of moving bodies, wherein the observing point is moved within a predetermined scope on the observing point basic figure calculated by the observing point basic figure calculating means.

Furthermore, it is desirable that an observing point is calculated and made it to be an observing point basic figure, and is further moved within a predetermined scope to determine the observing point.

Moreover, it is desirable that the aforementioned observing point position determining means determines the predetermined basic direction ($V'_f$) based on a vector achieved by multiplying a vector to the moving body or the group of moving bodies (Vf) by a predetermined transformation matrix (Gt) to make the vector rotate in a predetermined angle.

In addition, the predetermined transformation matrix (Gt) is a matrix randomly selected from multiple transformation matrixes previously provided ($G_l$ to $G_n$) and is preferably changed to another matrix randomly selected from the multiple transformation matrixes ($G_l$ to $G_n$) every predetermined time.

The present invention is an image displaying system comprising an image displaying device, input means capable of operating the input corresponding to each point on the display surface of the image displaying device, and a processing device for processing an input signal from the input means as well as displaying on the image displaying device images, wherein when there is any input in the input means, images around the point on the display surface corresponding to the input is clarified more than those before the input operates.

Moreover, images displayed on the image displaying device are images produced when virtual models generated on a virtual three-dimensional space are viewed from a predetermined observing point, and it is desirable that the virtual light is lit to and around a point on the virtual three-dimensional space displayed at the point on the display surface corresponding to the input from the point on the virtual three-dimensional space.

An image processing device of the present invention comprises an input deciding means for deciding an input to the input means capable of operating the input corresponding to each point on the display surface of the image displaying device and deciding a position on the display surface corresponding to the input, and a clarifying means for clarifying images at and around the point on the display screen corresponding to the input more than those before the input operates pursuant to the deciding result obtained by the input deciding means.

Moreover, it is desirable that the image displaying device of the present invention further comprises luminance deciding means for deciding that the luminance of images output in the image displaying device is less than a predetermined luminance, wherein the clarifying means operates pursuant to the deciding result of the luminance deciding means.

Images displayed in the image displaying device are images produced when virtual models generated on a virtual three-dimensional space are viewed from a, predetermined observing point, and it is desirable that the clarifying means throws virtual light to and around the point on the display screen corresponding to the input from one point on the virtual three-dimensional space.

Moreover, the image processing device of the present invention comprises a display unit in plane state for displaying models arranged on the virtual three-dimensional space as images viewed from a predetermined observing point, indication detecting means for detecting the position operated (indicated) on the display screen of the display unit and image controlling means for raising luminance on or around the point of the display screen corresponding to the position detected by the indication detecting means.

The image processing device of the present invention comprises a display unit in plane state for displaying a model arranged on a virtual three-dimensional space as an image viewed from a predetermined observing point, indication detecting means for detecting the position operated to the display screen of the display unit and image controlling means for increasing the lightness of the colors of images on or around the point on the display screen corresponding to the position detected by the indication detecting means.

The present invention is a viewing image displaying system comprising an image displaying device, an input means capable of operating the input corresponding to each point on the display surface of the image displaying device, and a processing device for processing an input signal from the input means as well as displaying the viewing image on the image displaying device, wherein when input is performed to the input means, information on the displaying object displayed at the position on the display surface corresponding to the input is displayed to the image displaying device.

Moreover, it is desirable that the input means is a touch-censor provided along the display surface of the image displaying device.

The present invention is a viewing image displaying device comprising a display unit for displaying viewing images upon viewing outside of a virtual window from the virtual window, wherein a member of framework in the shape corresponding to the virtual window is provided in front of the display surface.

Furthermore, it is desirable that the viewing images are images imitating under water behaviors.

The present invention is an image displaying system, comprising an image displaying device, input means corresponding to each point on the display surface of the image displaying device and a processing device for processing an input signal from the input means as well as displaying images of a plurality of moving bodies on the image displaying device, wherein when input is operated to the input means, a whole or a part of the multiple moving bodies are arranged along the trace of the points on the display surface corresponding to the input.

Moreover, it is desirable that a position on the display surface input by the input means is recorded at every predetermined time by a specific number, and the plurality of moving bodies are arranged on a predetermined number basis to each of the positions on the display surface recorded every predetermined time.

In addition, it is desirable that the plurality of moving bodies are allocated in a predetermined number by corresponding to each of the predetermined time and arranged in a predetermined number corresponding to each of the predetermined time to each of the positions on the display surface every predetermined time.

It is desirable that the plurality of moving bodies are arranged without piling on top of each other.

Furthermore, it is desirable that the aforementioned input means is a touch-censor provided on the display surface.

Images of the plurality of moving bodies are viewing images for displaying a plurality of animals, and it is desirable that when there is no input to the input means, the behavior of the plurality of moving animals are displayed on the image displaying device, and when there in any input to the input means, the plurality of animals are arranged on a predetermined position along the trace of the points on the display surface corresponding to the input.

The present invention is an image processing device, comprising image output means for outputting on the image displaying device images including a plurality of moving bodies, input recognizing means for recognizing inputs to an input device capable of inputting corresponding to each point on the display surface of the image displaying device in the predetermined numbers and moving body arranging means for arranging the moving bodies to a position on the display surface corresponding to the recognized input.

It is desirable that the aforementioned input recognizing means recognizes the input at every predetermined time over the predetermined numbers, and the moving body arranging means arranges the moving bodies to a position on the display surface corresponding to each input recognized at every predetermined time on a predetermined number basis.

It is desirable that the moving body arranging means decides whether the plurality of moving bodies are piled on top of each other on the display surface, and the position of the moving bodies is changed to prevent the displays of the moving bodies from piling on top of each other according to the deciding result.

The present invention is a viewing image displaying system comprising an image displaying device and a processing device for generating amusing images showing behaviors that a plurality of moving bodies move and displaying the images on the image displaying device, and a viewing amusement device, wherein, in a predetermined case, each of the moving bodies is arranged at the predetermined position previously recorded and a predetermined line drawing of which are drawn as a whole of the plurality of moving bodies.

The present invention is an image processing device comprising viewing image generating means for generating amusing images showing behavior that a plurality of moving bodies move and displaying the images on the image displaying device, time deciding means for deciding the elapse of a predetermined time from the commencement of the viewing image generating process and predetermined position arranging means for arranging each of the moving bodies to a predetermined position previously recorded based on the deciding result obtained by the time deciding means and drawing a predetermined line drawing as a whole of the plurality of moving bodies.

The present invention is an image processing device, comprising a display unit in the plane state for displaying models arranged in a virtual three-dimensional space as images viewed from a predetermined observing point, indication detecting means for detecting a position operated (detected) on the display screen on the display unit and image controlling means for changing the images according to the position detected by the indication detecting means, wherein the display unit is constituted by a plasma display device.

Moreover, it is desirable that the image controlling means changes the displaying status of a displaying body displayed on a position corresponding to the position operated to the display screen.

Furthermore, it is desirable that the indication detecting means is provided along the display surface of the display unit.

The present invention is a medium recording a program for making the processing device perform each of the means.

Further, the recording medium is a medium, wherein information (mainly digital data, program) are recorded by any physical means, and capable of making the processing device such as a computer, or a dedicated processor and the like operate a predetermined function. It may be a medium capable of downloading programs to a computer in any means and making a predetermined function to be performed. For example, a flexible disc, a fixed disc, a magnetic tape, a photo electro disc, CD, CD-ROM, CD-R, DVD-RAM, DVD-ROM, DVD-R, PD, MD, DCC, a ROM cartridge, a RAM memory cartridge with a battery back-up, a flash memory cartridge and a non-volatile RAM cartridge are included.

The case where data transfer from a host computer is received through wire or wireless communication network is included. As it is called, even inter-net is included the aforementioned recording medium.

BRIEF DESCRIPTION OF THE DRAWINGS

FIG. 1($a$) and FIG. 1($b$) are explanatory drawings comparing installation spaces between CRT device and plasma display device (PDP).

FIG. 2($a$) and FIG. 2($b$) are explanatory drawings comparing distortion of images between CRT device and plasma display device (PDP).

FIG. 15($a$) and FIG. 15($b$) are explanatory drawings showing images by, the drawing process.

FIG. 16 is a flowchart showing the procedure of operating the drawing process.

Figure 3:
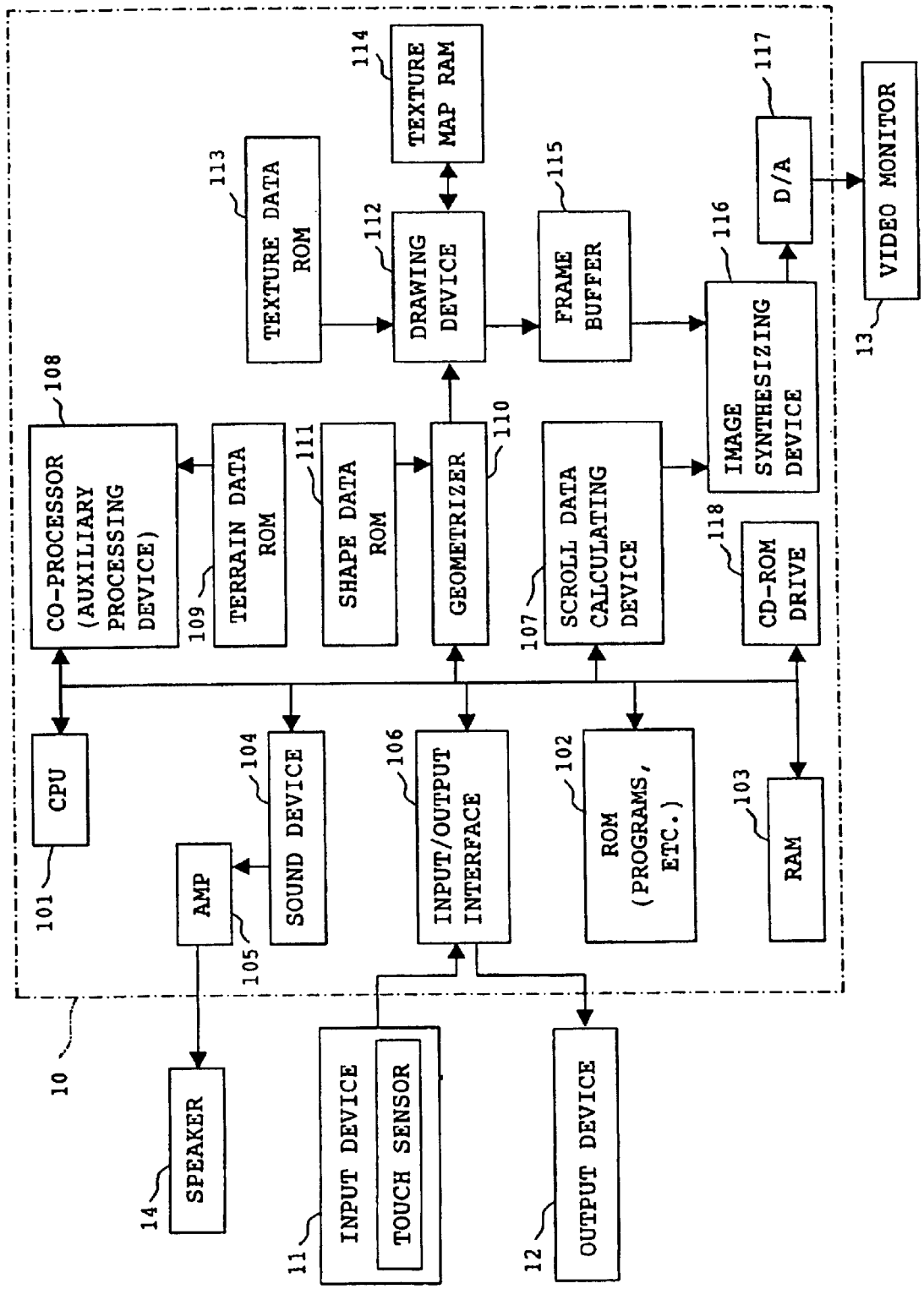
FIG. 3 is a block diagram showing a basic configuration of the viewing playing device of the present invention

Moreover, in the drawings, No.10 is the image processing device, No.11 is the input device, No.20 is the viewing playing device, No.13 is the image displaying device, No.131 is the plasma display device, No.132 is the touch censor, No.21 is the viewing playing device, No.135 is a Braun tube, No.136 is a front cover, and No.137 is the member of the framework.

BEST MODE FOR CARRYING OUT THE INVENTION

1. Configuration of the First Embodiment

Hereafter, the embodiment of the present invention is described. The first embodiment of the present invention is the viewing playing device, wherein fishes swimming in the water are displayed with a background screen (such as the appearance of the bottom of the sea) on the image displaying device providing with a large screen and a viewer enjoys the fishes in the aquarium, and the image displaying device and the image processing device that configures the viewing playing device. Moreover, the example of displaying fishes swimming in the water is described herein, but not limited to fishes, birds or planes in the air may be displayed and animals on the ground may be displayed.

FIG. 3 is a block diagram showing a basic configuration of a viewing amusement device 20 comprising an image processing device 10 according to the first embodiment. The processing device 10 is connected with an input device 11, an image displaying device 13 and a speaker 14 as necessary and otherwise an output device 12, and configures an image displaying system or a viewing amusement device.

The input device 11 (indication detecting means) is constituted by a touch censor provided along a surface of a display unit in this embodiment. Furthermore, the input device 11 may be a device capable of input corresponding to each point on the display surface of the image displaying device 13 (a device capable of detecting a position operated (indicated) on a screen displayed of the displaying device), for example, though a mouse, a joystick and the like may also be available, a touch censor that is capable of easy input only by touching the display surface of the image displaying device and is far from being an obstacle even when it is installed as it is provided along the display surface is preferable.

Figure 4:
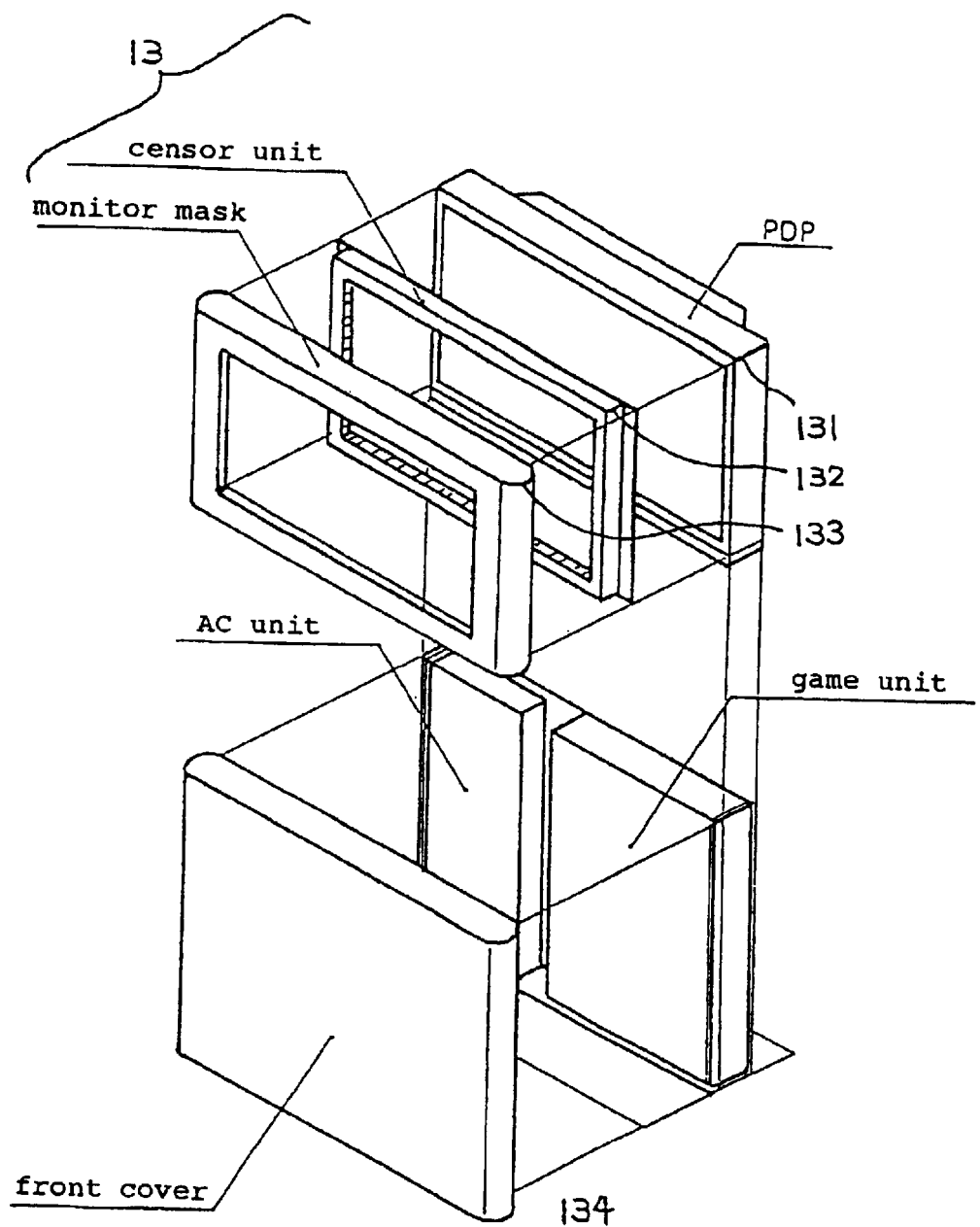
FIG. 4 is an explanatory drawing showing a concrete structure of the image displaying device according to the first embodiment.

The image displaying device 13 comprises a display unit constituted by a plasma display device. The specific configuration of the image displaying device 13 is schematically shown in FIG. 4. A plasma display device 131 is provided on the deepest surface of the image displaying device 13, a touch censor 132 which is the input device is provided in front of the plasma display device 131, an monitor mask 133 is provided in front of the touch censor 132, and a front cover 134 is provided in front of the monitor mask 133.

As shown in FIG. 1(a) and FIG. 1(b), the depth of the plasma display device (PDP) is less than that of the CRT device and the input device 11 constituted by the touch sensor is also provided along the surface of the plasma display device 131, and therefore, it is possible to hang the plasma display device on the wall and to establish it only in a small space if it has a large screen as much as 42 inches. Moreover, as shown in FIG. 2(a) and FIG. 2(b), the image displaying device, the screen of which configures with the uncurved plane, such as the plasma display device (PDP) causes less distort of the image viewed from the front than the curved displaying device such as CRT and the like. Furthermore, as this embodiment is the viewing playing device for displaying behaviors of fishes swimming, behaviors of big fishes swimming in a big water tank is also displayed due to the enlargement of the screen. A processing device 10 comprises a CPU (Central Processing Unit) 101 as well as a ROM 102, a RAM 103, a sound device 104, an input and output interface 106, a scroll data operation device 107, a co-processor (auxiliary operation device) 108, a landform data ROM 109, a geometrizer 110, a form data ROM 111, a drawing device 112, a texture data ROM 113, a texture map RAM 114, a frame buffer 115, a image composing device 116, a D/A converter 117 and a CD-ROM drive 118.

CPU 101 is connected, via bus line, with ROM 102 storing predetermined programs, the RAM 103 storing data, the sound device 104, input and output interface 106, scroll data operation device 107, the co-processor 108, the geometrizer 110, the CD-ROM drive 118 to read information recorded in a CD-ROM. The RAM 103 is to be functioned for the buffer, and used for writing various commands to the geometrizer 110 (display of objects, etc.) and writing matrix upon operating the conversion matrix.

The input and output interface 106 is connected with the input device 11 and the output device 12, thereby operation signals of the input device 11 are incorporated into the CPU 101 and signals generated in the CPU 101, etc. may be output to the output device 12.

The sound device 104 is connected with the speaker 14 via the power amplifier 105 and sound signals generated at the sound device 104 are power amplified, and output from the speaker 14 as sound.

In this embodiment the CPU 101, based on the internal program of the ROM 102, reads operation signals from the input device 11 and landform data from the landform data ROM 109, or form data from the form data ROM 111 (three-dimensional data such as fishes, sea floor landform and the like), and performs behavior calculations (simulations) of fishes such as collision (hit) judgement between fishes and the sea floor.

The behavior calculation of fishes is for simulating the movement of the fishes in the virtual space based on the predetermined program, and after the coordinate values In the three-dimensional space are determined, conversion matrix and form data (such as fish and landform) for converting the coordinate value into a visual field coordinate system are designated to the geometrizer 110. The landform data ROM 109 is connected to the co-processor 108, and predetermined landform data is delivered to the co-processor 108 (and CPU 101 ). The co-processor 108 mainly performs the collision judgment between fishes and landform, and responsible for the operation of floating points. Thus, as the collision (hit) judgment between fishes and landform is executed by the co-processor 108, and the judgment results are provided to the CPU 101, the operational load of the CPU is lightened and the collision judgment is executed more promptly.

The geometrizer 110 is connected to the form data ROM 111 and the drawing device 112. The form data ROM 111 previously stores form data of Polygon (three-dimensional data of fishes, landforms and backgrounds formed by the respective apexes) and these form data is delivered to the geometrizer 110. The geometrizer 110 performs perspective conversion to the designated form data with the conversion matrix sent from the CPU 101, and obtains data converted from the coordinate system of the virtual three-dimensional space to a visual field coordinate system.

The drawing device 112 affixes a texture to the form data of the converted visual field coordinate system and outputs the texture to the frame buffer 115. In order to affix such texture, the drawing device 112 is connected to the texture data ROM 113 and a texture map RAM 114, and also connected to the frame buffer 115. Moreover, polygon data shall mean a coordinate data group of relative or absolute coordinates of the respective apexes of polygons (polygonal: mainly triangles and quadrilaterals) formed from an aggregate of a plurality of apexes. The landform data ROM 109 stores polygon data that is set comparatively rough are sufficient upon executing collision judgements between the fishes and the landforms. Meanwhile, the shape data ROM 111 stores polygon data that is set more precisely in relation to shapes structuring screens such as fishes and backgrounds.

The scroll data operation device 107 is for calculating data of scroll screens of letters and the like. This operation device 107 and the frame buffer 115 arrive at the displaying device 13 via the image composing device 116 and a D/A converter 117. Thereby, polygon screens (simulation results) of fishes, landform (background) and the like temporarily stored in the frame buffer 115 and the scroll screens of letter information of fishes and the like are synthesized in accordance with a designated priority, and final frame image data is generated. This image data is converted into analog signals with the D/A converter 117 and sent to the displaying device 13, and displayed at the real time.

Moreover, this embodiment comprises the CD-ROM drive 118, but not limited, it may comprise a flexible disc, a magneto-optic disc or other reading means of storage media.

Figure 5:
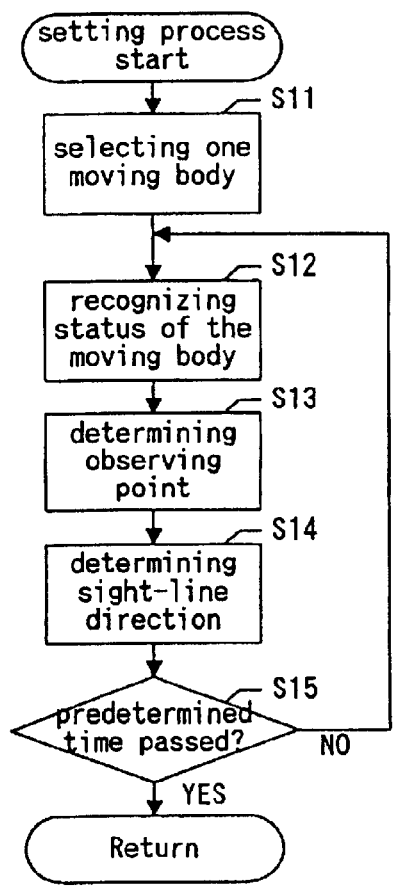
FIG. 5 is a flowchart illustrating the procedure of operating the determining process of an observing point and a sight-line.

2. Summary of Determining Process or Observing Point Position and Sight-Line Direction Next the contents of process in the processing device 10 are explained. FIG. 5 is a flowchart illustrating., the procedure of executing the determining process of the observing point and the sight-line by using the processing device 10 comprised with the playing device in this embodiment.

Firstly, the processing device 10 generates a virtual model respectively imitating a plurality of moving bodies moving in the virtual three-dimensional space. In this embodiment, the plurality of moving bodies are a plurality of fishes swimming freely in the virtual three-dimensional space. Three-dimensional polygon data of the moving bodies are previously recorded in the ROM, and the movement of swimming and the movement of the gills of the respective fish is performed in accordance with the program.

The processing device 10 selects one moving body from among the plurality of moving bodies which becomes a standard to determine the observing point and the sight-line (S11). This selection of the moving body is also performed in accordance with the program. Here, when a group of moving bodies uniformly moves in the same direction, at the same speed and the like, the group of moving bodies or any group of moving bodies moving together uniformly may be selected.

Next, the processing device 10 recognizes a "status" of the moving body or the group of moving bodies selected in S11 (S12). Here, the "status" of the moving body shall mean the position, the direction (the direction of the front of the moving body (head of fish)), the moving direction, moving speed and the like of the moving body in the virtual three-dimensional space. This status of the moving body is temporarily recorded in the RAM.

Moreover, the processing device 10 determines an observing point position in accordance with a status of the moving body or the group of moving bodies (S13). Though the method for determining the observing point position is explained below, it is possible to maintain the observing point position at the appropriate position to at least one fish and to appropriately display at least the one fish by determining the observing point position based on the status of the moving body.

Next, the processing device 10 determines a sight-line direction based on the status of the moving body or the group of moving bodies (S14). The method for determining the sight-line direction is also explained below.

The processing device 10 generates images, from time to time, produced when the moving bodies are viewed from the observing point to the sight-line direction based on the determined observing point and the sight-line as mentioned above and displays the images to the image displaying device 13.

Next, the time between the selection of the moving body in S11 and the determination of the sight-line in S14 is compared to the predetermined time it takes to change the decision standards of the observing point from one or a group of moving bodies to another moving body or another group of moving bodies (S15). When tho predetermined time does not elapse, the process returns to S12, and the status of the moving body is recognized again and then the observing point and the sight-line are renewed based on the newly recognized status. When the predetermined time is elapsed, the flow in FIG. 5 has ended once and the moving body selecting process of S11 is resumed by returning to the first process to determine an observing point based on the status of the other moving body. Thereby, it is possible to generate more variety of images.

As mentioned above, the observing point position and the sight-line direction are determined based on the status of one or a group of moving bodies from among a plurality of moving bodies so that the observing point and the sight-line may be appropriate to at least one or a group of moving bodies.

3. Calculating Process of Observing Point Position

Figure 6:
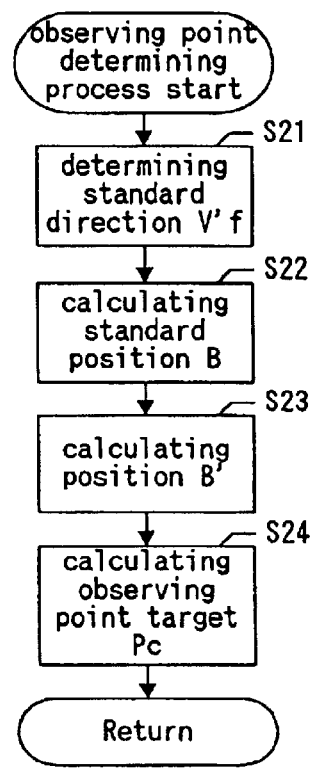
FIG. 6 is a flowchart illustrating the procedure of operating the observing point position determining process.
Figure 7:
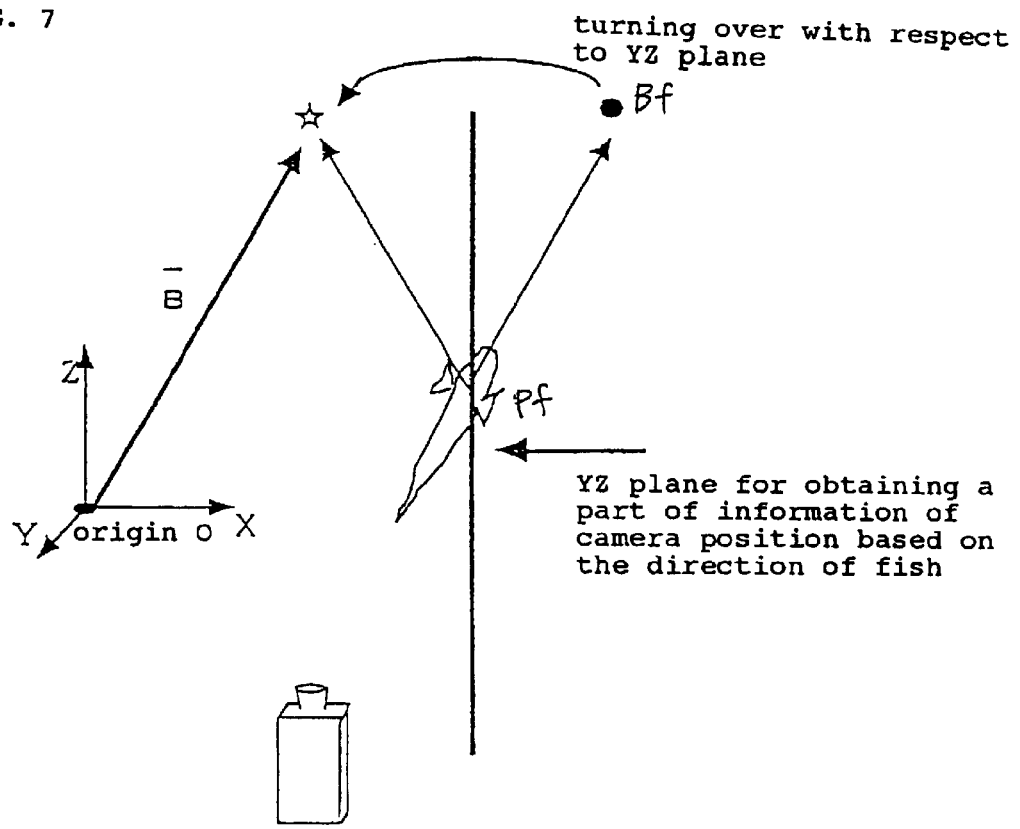
FIG. 7 is an explanatory drawing of the observing point position determining means.
Figure 8:
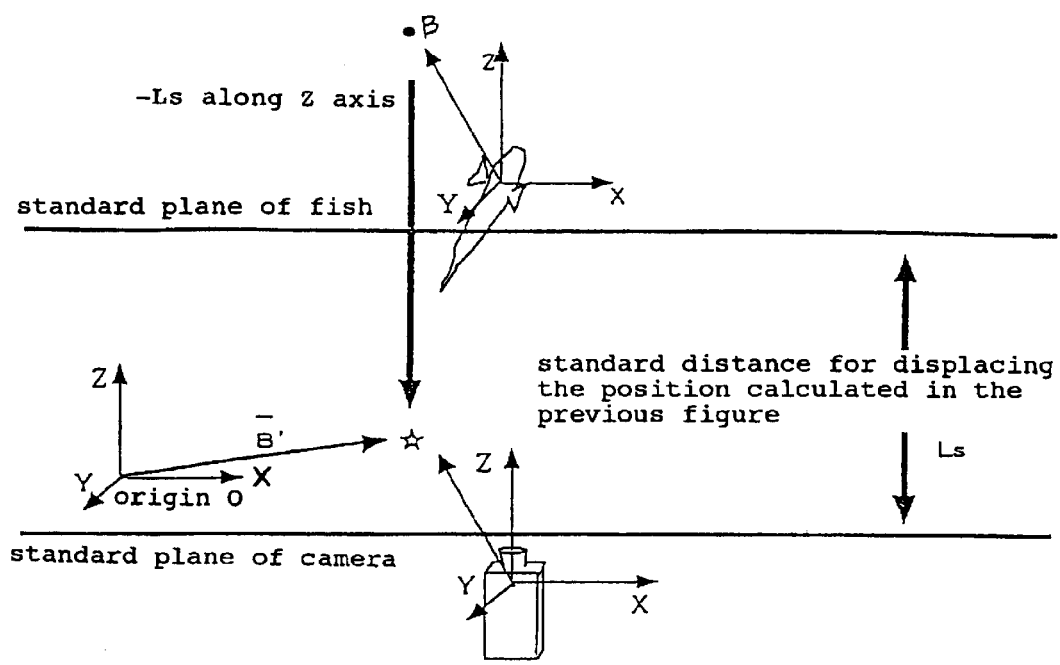
FIG. 8 is an explanatory drawing of the observing point position determining means.

After the "status" of one or a group of moving bodies is recognized in the above S12, the process of determining the observing point position in S13 is detailed. FIG. 6 is a flow chart showing the procedure to execute the observing point position determining process, FIG. 7 and FIG. 8 are explanatory drawings explaining the method of determining the observing point position in accordance with a coordinate system where the moving body moves. Here, in order to simplify, a point of origin of the coordinate system in the virtual three-dimensional space is established to the center point of the movable extent of the moving body.

Though in this coordinate system, the position of the observing point is determined at the position of the minus direction of the abridged Z axis, by the following calculation, variations are provided, for example, when the direction of the moving body becomes the direction far from the observing point, an observing point is determined at the position near the moving body, and when the direction of the moving body is the direction near the observing point, an observing point is determined at a position far from the moving body.

Firstly, the processing device 10 determines the predetermined standard direction V'f (referred to as Vf) based on the direction of one or a group of moving bodies recognized in S12 of FIG. 5 (S21). The predetermined standard direction is obtained by a slight rotation to various directions based on the direction vf of the moving body to perform the process for swaying the observing point as described below, but it may be the same value as that of Vf.

Next, the processing device 10 calculates the predetermined standard position B by the following calculation based on the position of the moving body recognized in S12 of FIG. 5 (referred to as Pf), the above predetermined standard direction V'f, and the standard direction Lf previously determined to determine the observing point position (S 22) (see FIG. 7).

$$B.x = -V'f.x \times Lf + Pf.x \quad \text{formula (1x)}$$

$$B.y = V'f.y \times Lf - Pf.y \quad \text{formula (1y)}$$

$$B.z = V'f.z \times Lf + Pf.z \quad \text{formula (1z)}$$

The predetermined standard position B is easy to be understood as compared with the position (Bf) only the above standard distance Lf away from the position of the moving body or the group of moving bodies Pf to the predetermined standard direction V'f. The position Bf is found by the following formulae.

$$Bf.x = V'f.x \times Lf + Pf.x \quad \text{formula (1'x)}$$

$$Bf.y = V'f.y \times Lf + Pf.y \quad \text{formula (1'y)}$$

$$Bf.z = V'f.z \times Lf + Pf.z \quad \text{formula (1'z)}$$

As predetermined in the aforementioned formula (1z) and (1'z), Z coordinate B.z of the predetermined standard position B is the same as Z coordinate Bf.z of the aforementioned position Bf. Accordingly, the predetermined standard position B is on the same face as the plane vertical to Z axis including the position Bf.

Consequently, when the direction of the moving body Vf (=V'f) becomes a plus direction of the Z axis (the direction away from the observing point), the predetermined standard position B moves to the plus direction of the Z axis and the observing point also moves to the plus direction of the Z axis (approaching to the moving body). On the contrary, when the direction of the moving body Vf becomes a minus direction of the Z axis (the direction near to the observing point), the predetermined standard position B moves to the minus direction of the Z axis and the observing point also moves to the minus direction of the Z axis (away from the moving body).

As predetermined in the aforementioned formula (1Z), the degree that the predetermined standard position B or the observing point position gets out of the position to the plus direction or the minus direction of the Z axis depends on (is in proportion to) the standard distance Lf. The degree of the standard distance Lf is previously determined to the degree depending on the size of the selected moving body in the present embodiment.

Moreover, as shown in the above formula (1x), the position of the X axis B.x of the predetermined standard position B is the position where the above position Bf is turned round as symmetrical to the face parallel to the YZ plane including the position of the moving body Pt. Thereby, the movement of the observing point position depends on the movement of the moving body and appropriately changes to prevent viewers from getting bored.

Furthermore, as shown in the above formula (1y), the Y axis of the predetermined standard position B.y also changes by making the mark of the Y axis Pf.y of the position of the moving body Pf turn round, as compared with the formula to find the Y axis of the position Bf (1'y). In particular, in the present embodiment, as a plurality of moving bodies are a group of fishes, the change to the horizontal direction (the direction of the X axis or the Z axis) is less than that to the vertical direction (the direction of Y axis), the change of the observing point position is little affected even if the mark or V'f.y Is made to be turned round in the formula (1y). Accordingly, in the formula (1y), the mark of Pf.y is made to be turned round.

Next, the processing device 10 calculates the position B', the predetermined distance Ls away from the above predetermined standard position B to the minus direction of the Z axis (S23) (see FIG. 8). That is, $$B'.x = B.x \quad \text{formula (2x)}$$

$$B'.y = B.y \quad \text{formula (2y)}$$

$$B'.z = B.z - Ls \quad \text{formula (2z)}$$

However, in case that the observing point is set in this position B', for example, when the standard moving body moves to the limitation of the movable scope to the plus direction of the Z axis, the observing point also moves to the plus direction of the Z axis with the movement of the moving body. thereupon, there is a possibility that it becomes difficult to view the image as the observing point comes in the movable scope of a plurality of the moving bodies too far, and the observing point comes across moving bodies other than the standard moving body or other moving bodies are displayed extremely wide. Accordingly, such correction of the position B' as moving the position B' to the minus direction of Z axis in order to prevent the observing point from coming in the movable scope of the moving body too far and fall the observing point within the scope previously determined is performed and the observing point target position Pc is calculated (S24).

As mentioned above, as the observing point position is determined considering the position and the direction of the moving body, the distance between the moving body and the observing point is kept appropriately. Moreover, when the depth where fishes are swimming changes or the direction of fishes changes vertically, the position of a camera also changes vertically so that the image of which the game player is not tired may be generated.

(Calculating Process of Sight-line Direction)

Next, explained is the processing for determining the position of a watching point and calculating the direction of the observing point in S14 of the FIG. 5. Firstly, when the position of the watching point is set at the position of the moving body Pf, it is difficult to obtain an image in the moving direction of the moving body and the image may look bad. Accordingly, based on the present position (the latest position) of the moving body and the past position of the moving body before the predetermined time (before n frame), the future anticipated position of the moving body P'f is calculated and taken as the target position of the watching point.

When the position of the moving body in the latest (the immediately preceding) frame refers to $K_0$, and the position before another frame refers to $K_{-1}$, the position before two frames refers to $K_{-2}, \ldots, \ldots$ the position before n-frame refers to $K_{-n}$, the anticipated position of the moving body before one frame P'f is $$P'f \cdot x = K_0 \cdot x + \quad \text{formula (4x)}$$

$$\{(K_0 \cdot x - K_{-1} \cdot x) + (K_{-1} \cdot x - K_{-2} \cdot x) + \ldots +$$

$$(K_{-(n-1)} \cdot x - K_{-n} \cdot x)\} \div n$$

$$= K_0 \cdot x + (K_0 \cdot x - K_{-n} \cdot x) \div n$$

As is the case of the Y coordinate and the Z coordinate, $$P'f.y 32 \ K_0.y + (K_0.y - K_{-n}.y) \div n \quad \text{formula (4y)}$$

$$P'f.z = K_0.z + (K_0.z - K_{-n}.z) \div n \quad \text{formula (4z)}$$

Based on the above, the vector of the sight-line (target value) V'c toward the target position of the watching point P'f from the target position of the above observing point Pc is found by the following formulae:

$$V'c.x = P'f.x - Pc.x \quad \text{formula (5x)}$$

$$V'c.y = P'f.y - Pc.y \quad \text{formula (5y)}$$

$$V'c.z = P'f.z - Pc.z \quad \text{formula (5z)}$$

Thereby, when the moving body is moving, the sight-line can be placed toward the front of the direction of movement and the moving body can be displayed to be easy to see.

(Process for Moderating Change of Movement of Observing Point and Sight-line)

In case that the observing point is set at the target position of the observing point Pc found above and is renewed every frames, the observing point position changes in accordance with the movement of the moving body. In particular, when the direction of the moving body extensively changes suddenly, the position of the observing point extensively suddenly changes and it may become difficult to see the image Accordingly, the target position of the observing point Pc is renewed to the observing point position at the immediately proceeding frames Pp with a few percent of weight per frame as follows:

$$Pn.x = R \times Pc.x + (1-R) \times Pp.x \quad \text{formula (6x)}$$

$$Pn.y = R \times Pc.y + (1-R) \times Pp.y \quad \text{formula (6y)}$$

$$Pn.z = R \times Pc.z + (1-R) \times Pp.z \quad \text{formula (67)}$$

Here, R is the aforementioned weight. By this calculation, a position (Pn) where the line segment between the observing point position determined at the immediately proceeding frame (Pp) and the target position of the observing point newly calculated at a predetermined time later (Pc) is shared at a predetermined ratio (1–R to R) is calculated. Thereby, even if fishes immediately change the position and the direction, the position of the camera is not changed extremely immediately and widely, and the movements of fishes are moderated and easy to see because the change of the position of the camera delays. In this embodiment, the observing point is determined based on the fishes swimming in the water, the image looks like that the camera is floating in the water.

Similarly, as to the vector of the sight-line, the target value of the vector of the sight-line V'c is renewed to the vector of the sight-line at the immediate proceeding frame with a few percent of weight per frame, and Vector of the sight-line Vn is led as follows:

$$Vn.x = S \times V'c.x + (1-S) \times Vp.x \quad \text{formula (7x)}$$

$$Vn.y = S \times V'c.y + (1-S) \times Vp.y \quad \text{formula (7y)}$$

$$Vn.z = S \times V'c.z + (1-S) \times Vp.z \quad \text{formula (7z)}$$

Here, S is the aforementioned weight. By this calculation, the change of the direction of the sight-line delays the change of the position or the direction of fishes so that the movement of fishes is moderated and easy to see as the extremely immediate and large change of the direction of the sight-line disappears.

4. Process of Swaying Observing Point

Next, explained is the process for determining the predetermined standard direction V'f based on the direction of the moving body Vf. In this process, a slight rotation is performed to various directions based on the direction of the moving body Vf in order to conduct the process of swaying the observing point.

Transformation matrix of n-pattern to conduct the blight rotation without changing the size of the vector Vf of the direction of the moving body refers to $G_1, G_2, \ldots, G_n$, and a very tiny value compared to the aforementioned standard distance Lf refers to Lg. The offset vector obtained in each pattern of $S_1, S_2, \ldots S_n$ is $$S_1 = Lg \cdot Vf \cdot G_1$$

$$S_2 = Lg \cdot Vf \cdot G_2$$

...

$$S_n = Lg \cdot Vf \cdot G_n \quad \text{formula (8).}$$

The observing point position is calculated by randomly replacing these Shd $1, S_2, \ldots, S_n$ with Vf of formula (1x) to (1z). Thereby, it is possible to make the observing point position move by staying within a predetermined slight scope with and by roughly complying with the movement of formulae (2), (5), (6) and (7).

Moreover, the movement of swaying the observing point may also be realized by calculating the standard value of the observing point based on the movement of the moving body and making the observing point move within the predetermined scope of the observing point standard value-centered.

Thereby, even if the moving body moves little, the observing point moves as if it follows a plurality of points and the images of the moving body viewed from various positions so that the variety of displays further increase.

5. Clarifying Process

Figure 9:
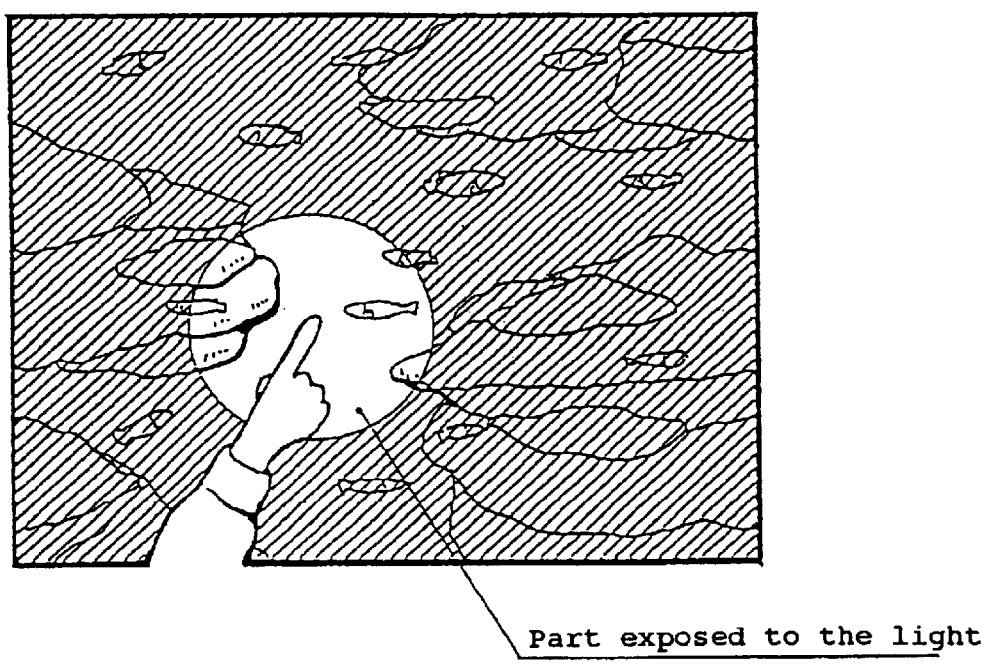
FIG. 9 is an explanatory drawing showing images by the clarifying process.
Figure 10:
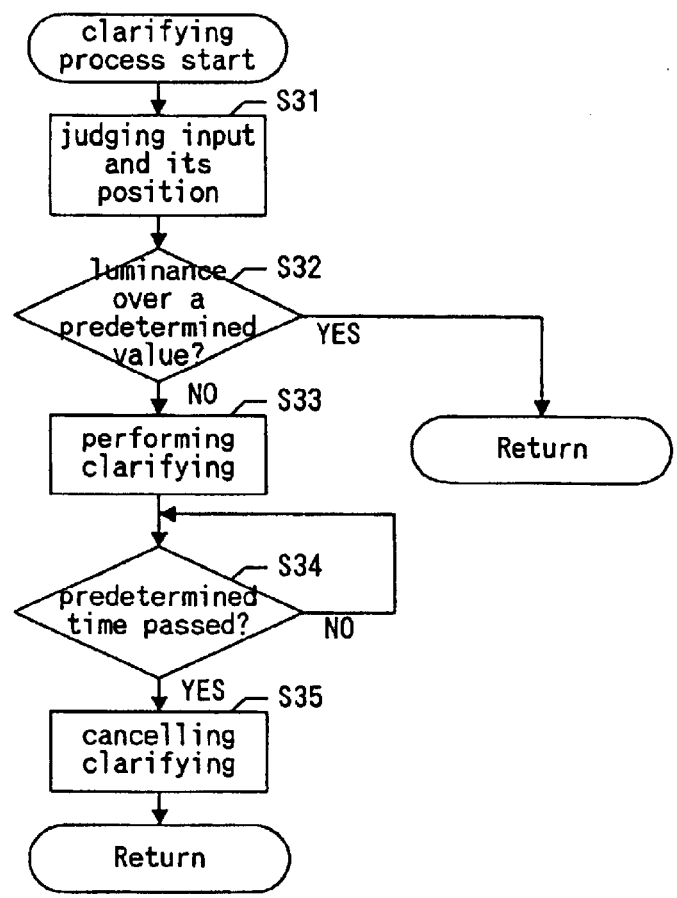
FIG. 10 is a flowchart showing the procedure of operating the clarifying process.

In the viewing playing device 20 of the present embodiment, at the time of a predetermined mode, when a game player touches the screen, the part being touched and its circumference on the screen are only made brighter than those prior to the touch and the clarifying process of images is performed (see FIG. 9 ). FIG. 10 is a flowchart showing the procedure of executing such process.

Firstly, the processing device 10 decides whether there is any input in a touch censor 132 that is an input device and which position on the image displaying device such input is performed (S31).

Next, the processing device 10 decides whether the luminance of the place where the input is performed on the screen is dark rather than a predetermined luminance (S32). When the luminance is darker than the predetermined luminance, the processing device 10 goes to the next step. Meanwhile, when the screen is bright with luminance more than the predetermined luminance, this clarifying process is not performed.

Next, the processing device 10 performs the clarifying process at and around the point in the virtual three-dimensional space corresponding to the place where the input is there on the screen (S33). Concretely, the virtual light (here, the source of the light is a spotlight) is sent to and around the place where the input is performed from the observing point for performing a two-dimensional projection of virtual models imitating a plurality of moving bodies and reflection of the light on the virtual modes are simulated and the image in the status where the light is shone on the virtual models are generated. By shining light on like this, luminance and brightness is promoted and the contrast is also clarified so that fishes not seen clearly due to darkness are also clarified (see FIG. 9). Moreover, as the simulation is performed considering the decrease of the light due to the distance between the source of light and the virtual model, when no virtual models are there in the target image element, the illuminating operation is not performed. Thereby, as the part where the distance between the source of light and the virtual model is far does not grow much light, it is possible to perform the clarified expression being rich in reality. Furthermore, as a position of the source of light is the same as the observing point position, the shadow by the virtual mode is not formed.

Next, the processing device 10 judges that a predetermined short time has elapsed from the commencement of the clarifying process in the position where the input is performed (S34), and then finishes the clarifying process of such part (S35). Accordingly, when a game player touches the screen and moves it's hand over surface of the screen, the part where the clarifying process is performed is also changed in accordance with the movement and the image where the brightening position is generally changed such as a search light is generated.

In addition, the presentation that fishes gather to the part brightened by the light may be performed by affecting the movement of the moving bodies by the clarifying process.

Thereby, it is possible to designate the place to be clarified only by touching a certain place on the screen with the hand in this embodiment. This embodiment enables the enjoyment of the game by the easy operation of the game.

6. Information Output Process

Figure 11:
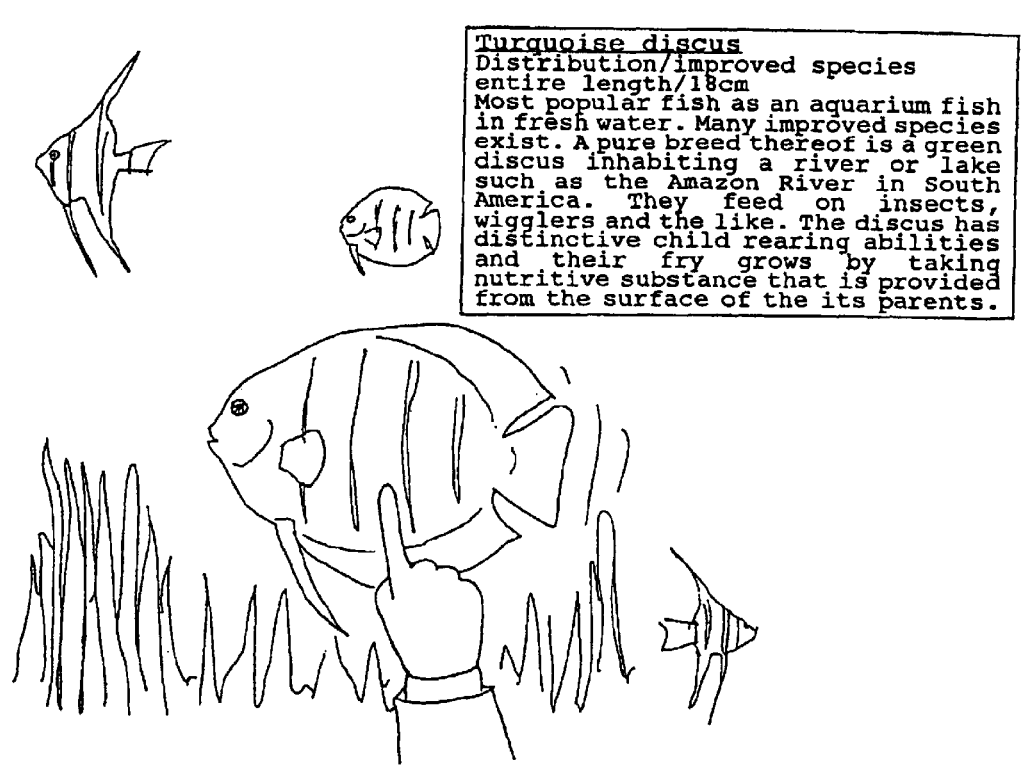
FIG. 11 is an explanatory drawing illustrating images by the information outputting process.

The viewing playing device 20 in this embodiment makes it possible that if a game player, at a predetermined mode, touches the displaying part of the moving bodies (fishes) displayed in the image displaying device 13, the data of the moving bodies are displayed on a part of the image displaying device and the game player can use it as a pictorial book of animals (see FIG. 11).

Figure 12:
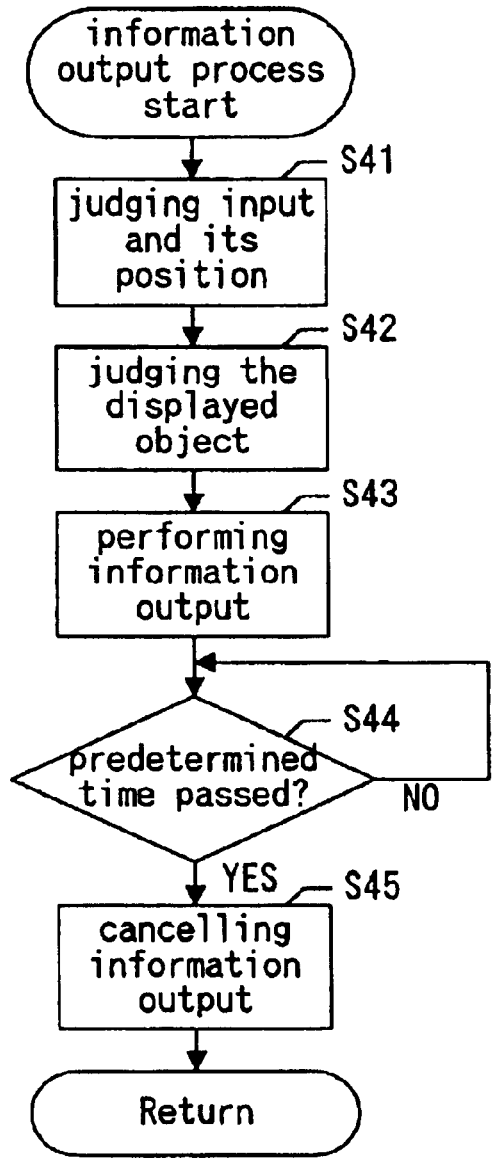
FIG. 12 is a flowchart illustrating the procedure of operating the information outputting process.

FIG. 12 is a flow chart showing the procedure of executing the information output process. Firstly, the processing device 10 judges if there is any input to the touch censor 132 of an input device, and when input is there, it judges the position on the screen corresponding to the input (S41).

Next, the processing device 10 judges what the displayed objects being displayed at the position where the input was performed are (S42). And then, the processing device 10 outputs information regarding the displayed objects previously recorded in ROM to the display unit of the image displaying device 13 (S43) (see FIG. 11). In this case, when the information is displayed, the information is displayed near the ends of the display unit not to cover the corresponding displayed objects with the display part of the information (preferably, keep each part from being overlapped).

When the same displayed object is continually input into the input means, the processing device 10 continues to display the information, and when the input completes or the input objects changes to other displayed objects, the processing device 10 finishes the display of the information of the displayed objects.

7. Configuration of the Second Embodiment

Next, the image displaying device, the image displaying system, the image processing device and the viewing playing device in accordance with the second embodiment of the present invention are explained. Though the basic configuration of this embodiment is almost the same as the basic configuration of the first embodiment shown in FIG. 3, the image displaying device 13 is different from the image displaying device in the first embodiment in the following points.

Figure 13:
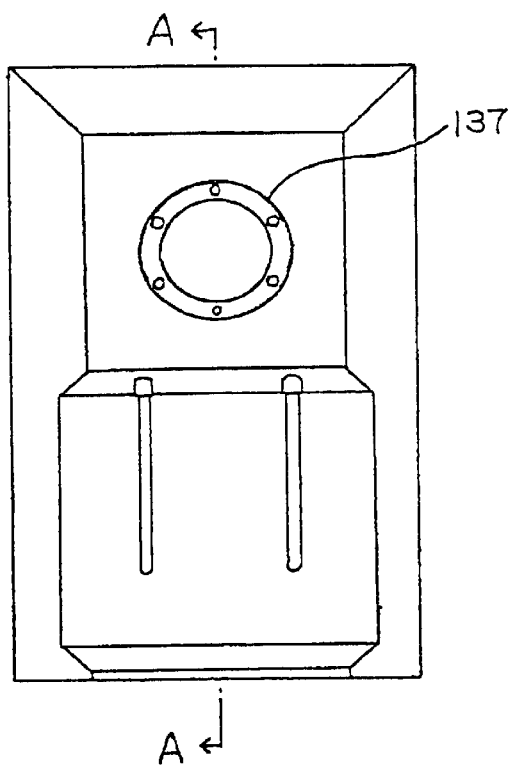
FIG. 13 is a front view showing the appearance of the playing device of the second embodiment.
Figure 14:
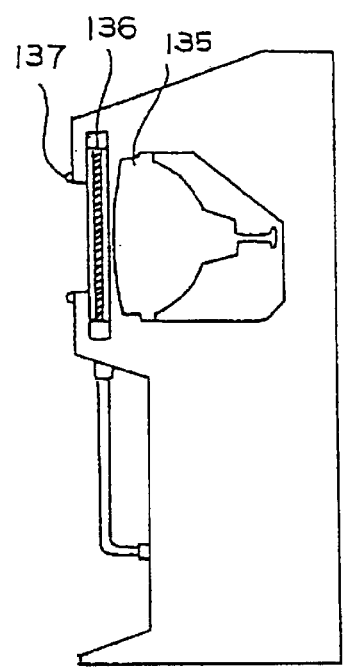
FIG. 14 is a sectional view taken substantially along the line A—A of FIG. 13.

The display unit of the image displaying device 13 in the second embodiment is configured with the Braun tube 135. FIG. 13 is a front view showing the appearance of the playing device 21 of the second embodiment and FIG. 14 is a sectional view taken substantially along the line A—A of FIG. 13. As shown in these figures, the front of the Braun tube 135 comprises a transparent front cover 136 with a touch censor and a member of framework 137.

The member of framework 137 imitates the form of a window of the submarine, and the thickness between the front of the member of framework 137 and the front cover 136 is about five (5) centimeters, and the thickness between the member of framework 137 and the Braun tube 135 is about ten (10) centimeters.

The viewing images produced when outside of a virtual window, viewed from the window, is displayed in the Braun tube 135. As the member of framework with the form corresponding to the virtual window is installed in the front of the display unit and thickness is also given to the front of the display unit shown above, an impression that the viewer is looking outside from the window in effect is given to the viewer. Particularly, in this embodiment, as the virtual window is the submarine window and the viewing images are the images produced when the behavior in the water (such as fishes swimming around in the water) is viewed from the submarine, it is efficient to give the viewing image reality.

8. Drawing Process

Next, explained is the procedure of the image process in the second embodiment. In the viewing playing device 21 of the present embodiment, though in a case where there is no input, the behavior where many small fishes of the moving bodies are swimming around in the water is displayed in the image displaying device 13, when the player passes its finger over the screen (FIG. 15($a$)), these many fishes swim to the predetermined place on the tracing line created by moving a finger on the surface of the screen and form a line, and thereby, such a line drawing (letters, drawings and other forms) as the player passed its finger over the screen can be drawn by a plurality of these small fishes in whole (FIG. 15($b$)). FIG. 16 is a flow chart showing a procedure for executing the arrangement of small fishes by this drawing process and FIG. 17 is an explanatory drawing of the content of the process.

The processing device 10, in a case where that there is no input, displays the behavior of many small fishes swimming around in the water the image displaying device 13 (S51). When there is any input to the touch censor of the input means (S52), the processing device 10 recognizes the content of such input for a predetermined time (for two (2) seconds in this embodiment) and records the position on the display surface corresponding to the input every predetermined minute time (every one (1) interrupt, namely every one sixtieth ($\frac{1}{60}$) second in this embodiment) record on the recording means (S53). In this embodiment, as the input corresponding position for two (2) seconds is recorded every one sixtieth ($\frac{1}{60}$) second, one hundred twenty (120) input corresponding positions are recorded. If any input is performed after the elapse of predetermined time capable of input, the input (any inputs corresponding to the time beyond one hundred twentieth input in FIG. 17) is not recognized.

Figure 17:
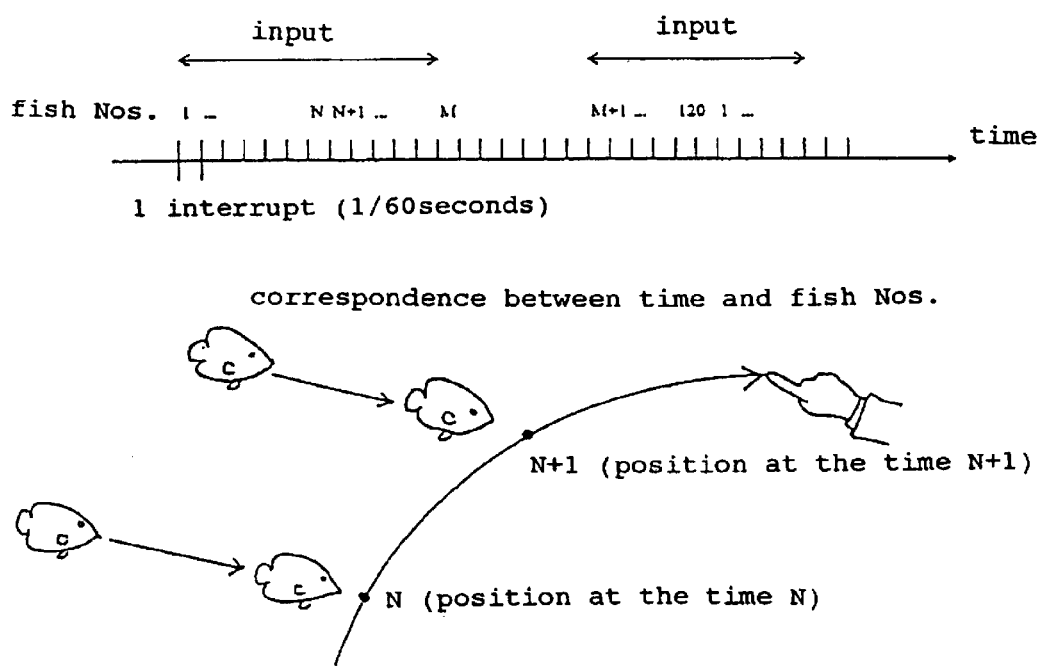
FIG. 17 is an explanatory drawing of the drawing process.
Figure 18A:
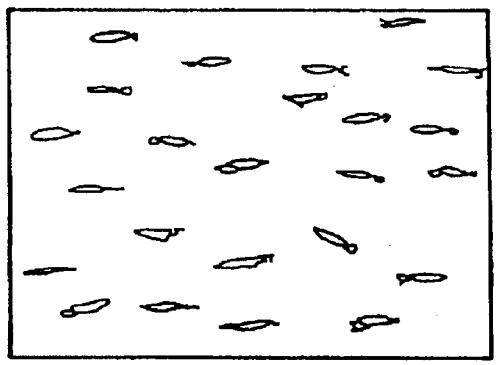
FIG. 18($a$)–18($d$) are explanatory drawings showing images by the predetermined position arranging process.
Figure 18B:
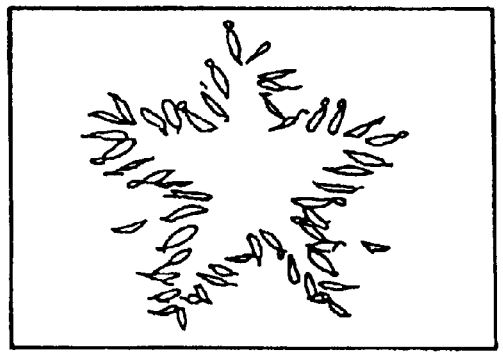
Figure 18C:
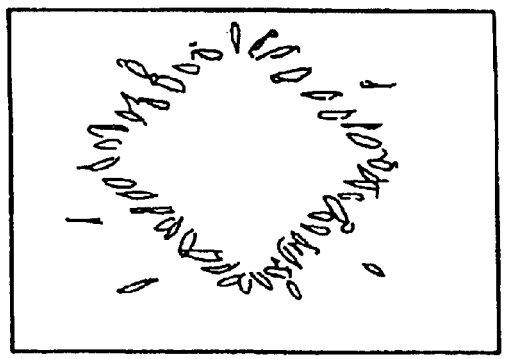
Figure 18D:
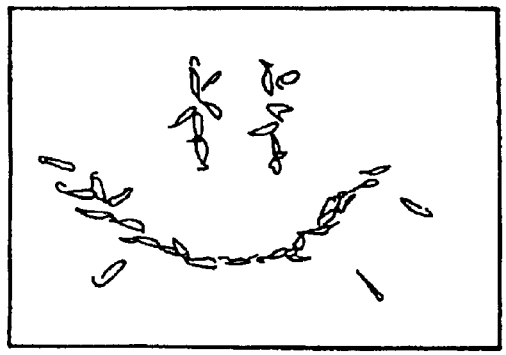

When input is interrupted (for example, when the input corresponding to the $M^{th}$ time in FIG. 17 is performed, the input is interrupted), resumption of the input must be delayed until the predetermined time limit. When input is resumed within the predetermined time capable of the input resumption, the predetermined time is extended only for the time from the input interruption to input resumption (positions corresponding to the position from the M+lst time to the $120^{th}$ time are recorded following M). Moreover, during the predetermined time capable of input, any sound or music may be produced in order to inform players the capability of recognizing the input and recording thereof.

When the input is not resumed within the predetermined time capable of resuming input, even if the recognized input points are less than, 120 points, the recognition and the record of the input is half-way finished and the moving bodies corresponding to each minute time are arranged only to the positions recorded then. The moving bodies corresponding to the time not input are arranged to the ends of the display unit or go to the outside of the display unit from the ends of the display unit.

Next, the processing device 10 arranges a plurality of moving bodies (small fishes) on the input positions each and every time as mentioned above by certain numbers to each position (one by one in this embodiment) (S54). As to each of the plurality of moving bodies, the position corresponding to the input position of every input time is previously determined, and every moving body is respectively arranged to the position corresponding to the input for the time previously determined. For example, as mentioned in FIG. 17, a fish of number N is arranged in the input position corresponding to time N, and a fish of number N+1 is arranged in the input position corresponding to time N+1. After arrangement, though the position of every moving body does not change, it may be possible to make the moving bodies perform a predetermined motion. In this embodiment, the plurality of moving bodies is the plurality of small fishes and, after arrangement, the behavior of the moving body waving the caudal fin is displayed.

The processing device 10, when a plurality of moving bodies (small fishes) are arranged at the predetermined position, judges from time to time if every moving body collides (overlaps), and if every moving body does collide, the processing device 10 performs a process for separating these moving bodies from each other slightly. Thereby, the moving body is prevented from being concealed behind other moving bodies.

The moving bodies are arranged in S54, and then the predetermined time elapses (S55), the arrangement of the moving bodies are released (S56) and the process returns to S52. Thereby, the behavior where the plurality of moving bodies (small fishes) are freely swimming around in the water is displayed until the next input is performed.

In the above process, the game player, by moving its finger over the screen, can arrange the moving bodies moving around on the screen until then, and enjoy a new method of expression that the previous image displaying devices do not comprise. Moreover, in this embodiment, roughness and fineness among the moving bodies are accrued incident to the speed, at which the game player passes its finger over the screen, and thereby a variety of expression is made to be possible.

9. Specified Position Arranging Process

The viewing playing device 21 in this embodiment is configured to make the plurality of the moving bodies perform such arrangement as previously recorded every predetermined time, when input into the input device 11 is performed for a predetermined time (FIGS. 18(*a*)–18(*d*)).

In S52 of FIG. 16, a flowchart, when the processing device 10 judges that no-input status continues for a certain time, it arranges the plurality of moving bodies randomly moving around such as in FIG. 18(*a*), for example in FIG. 18(*a*), in accordance with the line drawings (letters, drawings and the like) previously recorded in ROM and display the plurality of moving bodies on the image displaying device 13. Furthermore, as the predetermined time elapses (S52), for example such as FIG. 18(*c*) or (*d*), the processing device 10 arranges and displays the plurality of the moving bodies in accordance with the other arrangement previously recorded. When there is any input in the input means, the process is shift to 553 and such arrangement as input is performed.

As mentioned above, in the viewing playing device, wherein a plurality of the moving bodies are displayed, it is possible to make the moving bodies arrange in the predetermined case to draw the predetermined line drawings and thereby, to add a new playing nature.

Moreover, it would be possible to set another game mode to the viewing playing device 21 or this embodiment, make the arrangement of the moving bodies that was arranged as the game player pass its finger over record onto a recording device such as RAM, and realize the arrangement once more after a predetermined period of time. In this case, it may be possible for the game player to use this viewing playing device as a message board, if the game player draws the letters for messages to the other game player on the display surface, records them in the recording device, and makes the arrangement thereof realize a predetermined time later (for example one (1) hour later).

In addition, in the second embodiment, many small fishes are assumed to be displayed as the plurality of moving bodies, but not limited to, it may be possible to display insects, birds or other animals as the plurality of moving bodies.

INDUSTRIAL APPLICABILITY

According to the present invention, it is possible to provide a high-playing-level playing device in a viewing amusement device and the like which produces viewing images indicating the behaviors of a plurality of moving bodies, in more details, comprises the following effects.

Firstly, provided an image processing device capable of retaining an observing point position to an adequate position against at least one fish by determining the observing point position based on a status of the moving body or the group of moving bodies, and adequately displaying the moving bodies moving around on the virtual space to prevent the viewer's interest thereof from decreasing by adequately displaying at least the one fish.

Secondly, provided an image processing device capable of adequately displaying the moving bodies moving around on the virtual space to prevent the viewer's interest thereof from decreasing by determining the observing point and the sight-line to make sure that the moving bodies are displayed.

Thirdly, provided an image processing device capable of adequately displaying the moving bodies moving around on the u virtual space to prevent the viewer's interest thereof from decreasing by making images change.

Fourthly, provided an image displaying system capable of selecting a part to be lightened only by performing a predetermined input on the screen.

Fifthly, enabled the enjoyment of the game to increase and make it easier to understand by displaying a plurality of fishes and other moving bodies to the image displaying device, and enabling to easily display the expression of each of these plurality of moving bodies in a viewing playing device where the moving bodies are enjoyed as virtual pets.

sixthly, provided a viewing image displaying device capable of displaying images being rich in reality.

Seventhly, provided a new method of expression in the image displaying system for displaying images drawn in accordance with the line tracing on the screen. Moreover, the displaying system enables a discretional arrangement of the moving bodies in accordance with the line traced in the viewing image displaying system, and addition of the viewing characteristics.

Eighthly, enabled the enjoyment of the game to increase by displaying a plurality of fishes and other moving bodies in the image displaying device and by making the moving bodies, in a usual status, naturally move and in a predetermined mode, putting the plurality of moving bodies at a predetermined arrangement to show a predetermined line drawings (characters, drawings and the like) as a whole in a viewing amusement device wherein the moving bodies are enjoyed as virtual pets.

Ninthly, provided an image displaying device capable of growing a screen larger as well as making the space of setting up thereof small. Furthermore, provided an image displaying device with a large screen wherein images are not distorted.

We claim:

1. An image displaying system, comprising:
    an image displaying device;
        input means capable of receiving an input corresponding to each point on a display surface of the image displaying device; and
    a processing device for processing an input signal from the input means as well as displaying the viewing image on the image displaying device,
    wherein upon receiving the input by said input means, a description of a displayed object is displayed by the image displaying device at a position on the display surface corresponding to the input, further wherein the position is such that the displayed description does not cover the displayed object.

2. An image displaying system according to claims 1, wherein said input means is a touch-sensor provided along the display surface of said image displaying device.

3. An image displaying system, comprising:
    an image displaying device;
    input means corresponding to each point on a display surface of the image displaying device; and
    a processing device for processing an input signal from the input means as well as displaying images of a plurality of moving bodies on the image displaying device, wherein one or more of the Plurality of moving bodies move freely in a random manner until an input is provided to the input means,
    further wherein upon providing input to the input means, a whole or a part of said multiple moving bodies are arranged to form a line along a trace of points on the display surface corresponding to said input.

4. An image displaying system according to claim 3, wherein positions on the display surface input by said input means are recorded at every predetermined time by a specific number, and said plurality of moving bodies are arranged on a predetermined number basis to each of said positions on the display surface recorded every predetermined time.

5. The image displaying system according to claim 4,
    wherein said plurality of moving bodies are allocated in a predetermined number by corresponding to each said predetermined time and arranged in a predetermined number corresponding to each said predetermined time to each of the positions on the display surface every predetermined time.

6. The image displaying device according to any one of claims 3 to 5, wherein said plurality of moving bodies are arranged without piling on top of each other.

7. The image displaying system according to any one of claims 3 to 5, wherein said input means is a touch-censor provided on the display surface.

8. The image displaying system according to any one of claims 3 to 5,
    wherein images of said plurality of moving bodies are images displaying a plurality of animals, and when there is no input to said input means, the behavior of said plurality of animals are displayed on the image displaying device, and when there is input to said input means, said plurality of moving animals are arranged on a predetermined position along the trace of points on the display surface corresponding to the input.

9. An image processing device, comprising:
    image generating means for generating images showing behaviors of moving bodies and displaying the images on the image displaying device, wherein one or more of the moving bodies move freely in a random manner until an elapse of a predetermined time;
    time deciding means for deciding the elapse of a predetermined time from a commencement of the image generating; and
    arranging means for arranging each of said moving bodies dispersed in a space to a predetermined position previously recorded based on a deciding result obtained by the time deciding means to draw a predetermined line drawing as a whole of said plurality of moving bodies.

10. A computer readable medium for storing computer program code for executing on at least one processor, a method for image processing, comprising:
    code for deciding an input to an input means capable of receiving input corresponding to each point on a display surface of an image displaying device and deciding a position on the display surface corresponding to the input;
    code for clarifying images at and around the point on the display surface corresponding to said input;
    code for producing on the display surface of the display device images of virtual models generated in a virtual three-dimensional space viewed from a predetermined observing point;
    code for displaying a description, wherein a position of the description is such that the displayed description does not cover the images of virtual models; and
    code for lighting a virtual light, and for simulating a reflection thereof, to and around a point in the virtual three-dimensional space at the point on the display surface.

11. A computer readable medium for storing computer program code for executing on at least one processor, a method for image processing, comprising:
    code for outputting on an image displaying device images including a plurality of moving bodies, wherein one or more of the plurality of moving bodies move freely in a random manner until inputs are provided to an input device;
    code for providing the inputs to the input device capable of inputting corresponding to each point on a display surface of the image displaying device in predetermined numbers; and
    code for arranging a whole or a part of the moving bodies to form a line along a trace of points on the display surface corresponding to the recognized input.

* * * * *